(12) United States Patent
Kelley et al.

(10) Patent No.: US 8,783,715 B2
(45) Date of Patent: Jul. 22, 2014

(54) GAS GENERATING SYSTEM

(75) Inventors: Derrick O. Kelley, Sterling Heights, MI (US); Robert J. Schubert, Jr., Oxford, MI (US); David T. Schumann, Oakland, MI (US); Steven N. Grucz, Rochester, MI (US); Federico Moreno, Macomb, MI (US); Larissa D. Pfendt, Warren, MI (US)

(73) Assignee: TK Holdings Inc., Armada, MI (US)

( * ) Notice: Subject to any disclaimer, the term of this patent is extended or adjusted under 35 U.S.C. 154(b) by 566 days.

(21) Appl. No.: 12/583,614

(22) Filed: Aug. 24, 2009

(65) Prior Publication Data

US 2010/0045009 A1      Feb. 25, 2010

Related U.S. Application Data

(60) Provisional application No. 61/189,804, filed on Aug. 22, 2008.

(51) Int. Cl.
    *B60R 21/264*      (2006.01)

(52) U.S. Cl.
    USPC .......................................... 280/741; 280/736

(58) Field of Classification Search
    USPC ............................ 280/741, 736; 102/530, 531
    See application file for complete search history.

(56) References Cited

U.S. PATENT DOCUMENTS

| | | | | |
|---|---|---|---|---|
| 5,299,828 A * | 4/1994 | Nakajima et al. | ............. | 280/741 |
| 5,478,109 A * | 12/1995 | Faigle et al. | ................ | 280/736 |
| 5,499,843 A * | 3/1996 | Faigle et al. | ................ | 280/741 |
| 5,533,754 A * | 7/1996 | Riley | ............................ | 280/741 |
| 5,609,360 A * | 3/1997 | Faigle et al. | ................ | 280/740 |
| 5,626,360 A * | 5/1997 | Lauritzen et al. | ............ | 280/741 |
| 5,636,865 A * | 6/1997 | Riley et al. | .................. | 280/741 |
| 5,645,298 A * | 7/1997 | Stevens et al. | ............... | 280/741 |
| 5,765,866 A * | 6/1998 | Canterberry et al. | ......... | 280/741 |
| 5,934,705 A * | 8/1999 | Siddiqui et al. | ............... | 280/736 |
| 5,951,041 A * | 9/1999 | Iwai et al. | ..................... | 280/737 |
| 6,062,142 A * | 5/2000 | Scheffee | ....................... | 102/289 |
| 6,065,774 A * | 5/2000 | Cabrera | ........................ | 280/741 |
| 6,095,561 A * | 8/2000 | Siddiqui et al. | ............... | 280/742 |
| 6,272,992 B1 * | 8/2001 | Chatley, Jr. | ................. | 102/202.5 |
| 6,314,888 B1 * | 11/2001 | Muller et al. | ................. | 102/530 |
| 6,336,659 B1 * | 1/2002 | Corrion | ........................ | 280/736 |
| 6,626,115 B2 * | 9/2003 | Lutz et al. | ..................... | 102/530 |
| 6,893,041 B2 * | 5/2005 | Elqadah et al. | ............. | 280/728.2 |
| 7,185,588 B2 * | 3/2007 | Clark et al. | ................... | 102/530 |
| 7,240,916 B2 * | 7/2007 | Bierwirth et al. | ............. | 280/736 |
| 7,267,365 B2 * | 9/2007 | Quioc | ........................... | 280/736 |
| 7,343,862 B2 * | 3/2008 | McCormick | .................. | 102/530 |
| 2005/0218637 A1 * | 10/2005 | Burns | ........................... | 280/741 |
| 2005/0235863 A1 * | 10/2005 | Stevens | .......................... | 102/531 |
| 2011/0057429 A1 * | 3/2011 | Hordos et al. | ................ | 280/741 |
| 2011/0181030 A1 * | 7/2011 | Burns | ............................ | 280/741 |
| 2012/0125219 A1 * | 5/2012 | Mayville et al. | .............. | 102/530 |

\* cited by examiner

*Primary Examiner* — Nicole Verley

(74) *Attorney, Agent, or Firm* — L.C. Begin & Associates, PLLC.

(57) ABSTRACT

A housing unit for a gas generating system is provided. The housing unit includes a housing and a thermal barrier covering a portion of the housing exterior. A gas generating system and a vehicle occupant protection system incorporating the housing unit are also provided.

5 Claims, 3 Drawing Sheets

GAS GENERATING SYSTEM

CROSS-REFERENCE TO RELATED APPLICATIONS

This application claims the benefit of U.S. Provisional Application Ser. No. 61/189,804 filed on Aug. 22, 2008.

BACKGROUND OF THE INVENTION

The present invention relates to gas generating systems and, more particularly, to a gas generating system employing a selectively applicable thermal barrier for attenuating the effects of elevated temperatures on gas generating system components.

SUMMARY OF THE INVENTION

In one aspect of the embodiments of the present invention, a housing unit for a gas generating system is provided. The housing unit includes a housing and a thermal barrier covering a portion of the housing exterior.

In another aspect, a housing unit for a gas generating system is provided including a housing and a thermal barrier covering a portion of the housing to deflect a portion of heat impinging on the covered a portion of the housing toward an uncovered portion of the housing.

In another aspect, a housing unit for a gas generating system is provided including a housing and a thermal barrier covering a portion of the housing so as to provide heating of an uncovered portion of the housing adjacent the covered portion at a greater rate than heating of the covered portion when heat from a heat source external to the housing impinges on the covered portion.

In another aspect, a housing unit for a gas generating system is provided including a longitudinal housing having an interior divided into first and second chambers, and a thermal barrier covering a portion of the housing exterior of the first chamber.

In another aspect, a method of assembling a housing unit for a gas generating system is provided. The method includes the steps of providing a housing, providing a thermal barrier, and covering a portion of the housing exterior with the thermal barrier so as to enable selective heating of the housing exterior.

DETAILED DESCRIPTION

Figure 1:
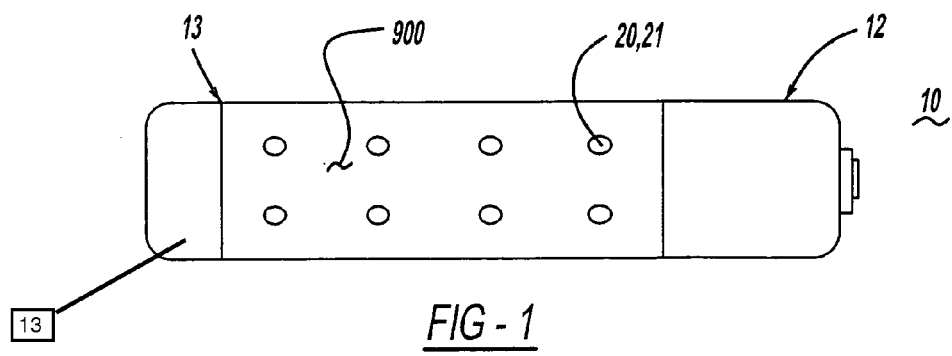
FIG. 1 is a side exterior view of a gas generating system incorporating a thermal shield in accordance with an embodiment of the present invention.
Figure 2:
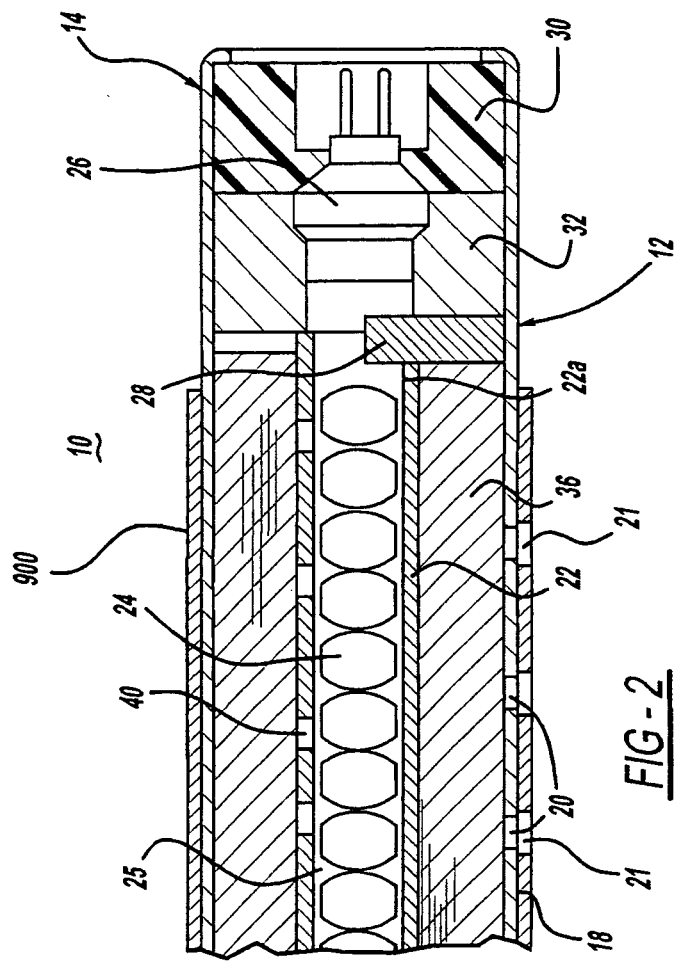
FIG. 2 is a cross-sectional side view showing the internal structure of the gas generating system of FIG. 1.
Figure 2:
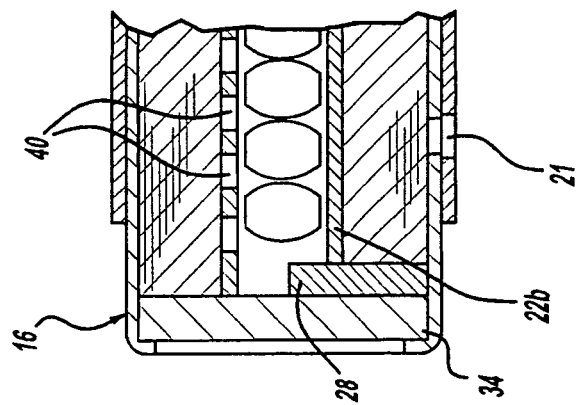

FIGS. 1 and 2 show views of an exemplary gas generating system 10 incorporating a thermal barrier or shield in accordance with a first embodiment of the present invention. Gas generating system 10 may constructed of components made from a durable metal such as carbon steel or iron, but may also include components made from tough and impact-resistant polymers, for example. One of ordinary skill in the art will appreciate various methods of construction for the various components of the gas generating system. U.S. Pat. Nos. 5,035,757, 6,062,143, and 6,347,566 exemplify typical designs for the various gas generating system components, and are incorporated herein by reference in their entirety, but not by way of limitation.

In the embodiment shown in FIGS. 1 and 2, gas generating system 10 includes a tubular housing 12 having a pair of opposed ends 14, 16 and a housing wall 18 extending between the ends. Housing 12 may be cast, extruded, or otherwise metal-formed. A plurality of gas exit apertures 20 are formed along housing wall 18 to permit fluid communication between an interior of the housing and an airbag (not shown) or other inflatable device after ignition of a gas generant 24 (described below) positioned within housing 12.

In the embodiment shown in FIGS. 1 and 2, a longitudinal gas generant enclosure 22 is inwardly radially spaced from a wall of housing 12 and is coaxially oriented along a longitudinal axis of the housing. Enclosure 22 has an elongate, substantially cylindrical body defining a first end 22a, a second end 22b, and an interior cavity for containing gas generant material 24 therein. Enclosure first end 22a is configured to enable fluid communication between an igniter 26 and the enclosure interior cavity either before of after activation of the gas generating system. A plurality of gas exit apertures 40 is formed along enclosure 22 to enable fluid communication between the interior of the enclosure and an exterior of the enclosure after ignition of gas generant 24. Enclosure 22 may be formed from any suitable material, using any of a variety of suitable methods. For example, enclosure 22 may be roll-formed from sheet metal and then perforated to produce apertures 40. Enclosure apertures 40 may be environmentally sealed with an aluminum tape (not shown) or any other effective seal.

Referring again to FIG. 2, a plurality of gas generant tablets 24 is stacked side by side along a length of enclosure 22. In the embodiment shown, each tablet 24 has substantially the same dimensions. However, any of a variety of alternative arrangements and/or forms of gas generant may be provided, depending on the requirements of a particular application. Examples of gas generant compositions suitable for use in the present invention are disclosed in U.S. Pat. Nos. 5,035,757, 6,210, 505, and 5,872,329, incorporated herein by reference. However, the range of suitable gas generants is not limited to those described in the cited patents.

A quantity of a known auto-ignition material 28 is positioned proximate either end of the stack of gas generant material 24 so as to enable fluid communication between the auto-ignition material and the gas generant 24 before and/or after ignition of the auto-ignition material. Auto ignition material 28 is a pyrotechnic material which is ignited by exposure to a temperature lower than the ignition temperatures of both gas generant 24 and booster propellant (if any) (not shown in FIG. 2) used in the gas generating system. In the embodiment shown in FIGS. 1 and 2, auto-ignition material 28 is also positioned so as to be in thermal communication with housing 12 such that heat transfer between the housing and the auto-ignition material is enabled when a portion of the housing not covered by a thermal shield 900 (described below) is exposed to elevated exterior temperatures. In the embodiment shown in FIGS. 1 and 2, auto-ignition material 28 is positioned so as to be in direct contact with housing 12.

As is known in the art, auto-ignition material 28 is ignited by heat transmitted from an exterior of housing 12 to the interior of the housing due to an elevated external temperature condition (produced, for example, by a fire). Combustion of auto-ignition material 28 results in combustion of gas generant 24, either directly or through intervening combustion of a booster material (not shown). Suitable auto ignition materials are known to those skilled in the art. Examples of suitable auto-ignition materials are nitro-cellulose based compositions.

An igniter 26 is secured within gas generating system 10 such that actuation of the igniter initiates combustion of gas generant 24 in a manner known in the art, after activation of the gas generating system. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. A second endcap 34 is crimped or otherwise fixed to a second end 16 of housing 12. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the gas generating system design for filtering particulates from gases generated by combustion of gas generant 24. In general, filter 36 is positioned between gas generant 24 and apertures 20 formed along gas generating system housing wall 18. In the embodiment shown in FIGS. 1 and 2, filter 36 is positioned exterior of gas generant enclosure 22 intermediate enclosure 22 and housing wall 18, and substantially occupies the annular space between gas generant enclosure 22 and housing wall 18. In an alternative embodiment (not shown), filter 36 is positioned in the interior cavity of enclosure 22 between gas generant 14 and enclosure gas exit apertures 40 formed along enclosure 22. The filter may be formed from any of a variety of materials (for example, a carbon fiber mesh or sheet) known in the art for filtering gas generant combustion products.

Referring again to FIGS. 1 and 2, in embodiments of the present invention described herein, a thermal barrier 900 covers a portion of the housing exterior to enable selective heating of the housing exterior. Barrier 900 is designed to attenuate or mitigate the effects of elevated external housing temperatures (due, for example, to exposure to flame) on the covered portion(s) of the housing and/or any heat-sensitive internal gas generating system components residing on or within the covered portion of the housing. As understood herein, the term "thermal barrier" is understood to mean a thermally-insulative and/or reflective material or element separate from the housing that can be applied to cover a selected portion of the housing exterior. As used herein, the terms "cover" and "covering" are understood to mean that the thermal barrier is applied to or positioned on a designated portion of the housing exterior so that a thermal barrier is formed between the designated portion of the housing and a potential external heat source, for example, during a bonfire event. As understood herein, the term "portion of the housing" is understood to designate a selected part or parts of (but not all of) the housing exterior. In combination, housing 12 and thermal barrier 900 form a thermally-shielded housing unit 13. As used herein, the term "selective heating" is understood to mean heating of a selected (i.e., uncovered) portion (or portions) of the housing exterior in preference to covered portions of the housing. Those portions of the housing exterior in thermal communication with an associated auto-ignition material positioned inside the housing will be relatively more exposed to externally-generated heat impinging upon the housing, and will generally heat before the covered portions of the housing exterior.

In one or more particular embodiments of the present invention, it is believed that a thermal barrier as described herein may provide heating of an uncovered portion of the housing adjacent a covered portion of the housing at a greater rate than heating of the covered portion, when heat from a heat source external to the housing impinges on the covered portion.

In one or more particular embodiments of the present invention, it is believed that a thermal barrier as described herein may provide heating of an uncovered portion of the housing adjacent a covered portion of the housing to a predetermined temperature prior to heating of the covered portion to the predetermined temperature, when heat from a heat source external to the housing impinges on the covered portion.

In one or more particular embodiments of the present invention, it is believed that a thermal barrier 900 as described herein serves to deflect heat impinging on the covered portion of the housing toward an uncovered portion of the housing. It is believed that a portion of this deflected heat may be transferred by convection to an uncovered portion (or portions) of the housing.

As the exposed end portions of the housing are in thermal communication with the auto-ignition material 28, direct and/or deflected heat impinging upon the exposed ends of the housing heats the auto-ignition material 28 to its ignition point before thermal damage occurs to the covered portions of housing 12. Combustion of auto-ignition material 28 produces ignition of gas generant 24 in a manner known in the art.

Embodiments of barrier 900 may be selectively applicable so as to permit a high degree of control over the portion or portions of the housing covered by the barrier. This permits application of the barrier material to selected portions of the housing while also permitting other portions of the housing in thermal contact with the auto-ignition compound to remain exposed or uncovered. Thus sensitive portions of the housing and/or housing interior can be protected to some degree from elevated external temperatures while still ensuring timely heat transfer to the auto-ignition material, thereby permitting the auto-ignition compound to activate when desired.

In one or more particular embodiments, barrier 900 is formed from a material containing a heat-reflective substance so as to reflect heat away from the covered portion of the housing outer surface.

In one embodiment, barrier 900 is formed by a sheet or film which can be attached to the housing exterior. In a particular embodiment, the sheet or film is a pressure-sensitive, adhesive backed sheet or film comprising a polyimide material. One example of a sheet or film suitable for the applications described herein is available under the designation "LG-1217" and may be obtained from LGI of Portland, Oreg. The material comprising the barrier may also be amenable to printing of information thereon.

After application of barrier 900 to housing 12, any of housing gas exit apertures 20 residing along a portion of the housing covered by the barrier must be either open or openable to expel generated gases out of the housing and past the thermal barrier. Any of a variety of methods may be employed for ensuring that gases exiting apertures 20 will be capable of passing through barrier 900.

For example, if the barrier material is applied as a sheet or film, through-holes 21 may be pre-formed in the sheet prior to application of the sheet to the housing. In a particular embodiment, the holes 21 are formed in a pattern conforming to the pattern of gas exit openings 20 formed in housing 12, so that each of holes 21 is in substantially aligned a corresponding one of gas exit openings 20.

Alternatively, through-holes 21 in the barrier material may be made after application of the barrier material.

In an alternative embodiment, portions of the barrier 900 that have been scored or otherwise weakened may be pre-formed in the sheet prior to application of the sheet to the housing. In this embodiment, gas pressure from the generated gases may be used to fracture the scored portions of the barrier, permitting exit of the generated gases. In this respect, the barrier material can serve as a seal or burst-disk for preventing moisture or other contaminants form entering the housing prior to gas generating system activation.

In another alternative embodiment, dowel pins may be inserted into apertures 20 prior to application of the barrier material to the housing. This may permit application of the barrier material by a molding, spraying, coating, or other deposition process, if so desired. The pins may then be extracted from the openings 20 after the barrier material has been applied.

In a first embodiment (shown in FIGS. 1 and 2), barrier 900 covers a substantial portion of the exterior of the housing. As seen in FIGS. 1 and 2, one or more end portions of the housing are in thermal communication with auto-ignition material 28 and are therefore left uncovered by barrier so that externally generated heat sufficient to ignite an auto-ignition material residing within the housing proximate the exposed end portion(s) may be transferred to the auto-ignition material in a timely manner. In addition, in particular embodiments, it is believed that a quantity of heat impinging on covered portions of the housing may be deflected along the thermal barrier toward an exposed portion of the housing exterior which is in thermal communication with the auto-ignition material.

In another particular embodiment (shown in FIGS. 3 and 4), a thermal barrier 901 in accordance with the present invention is applied to a dual-chamber gas generating system. In combination, housing 112 and thermal barrier 901 form a thermally-shielded housing unit 913.

Figure 3:
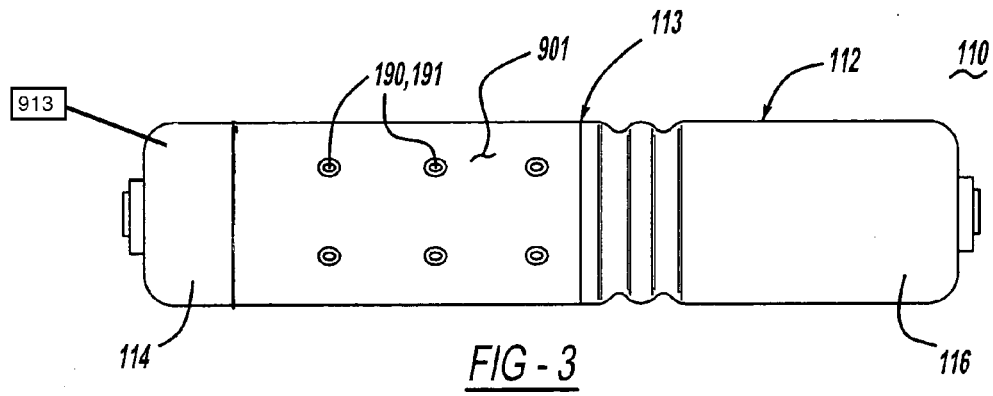
FIG. 3 is a side exterior view of a gas generating system incorporating a thermal shield in accordance with a second embodiment of the present invention.
Figure 4:
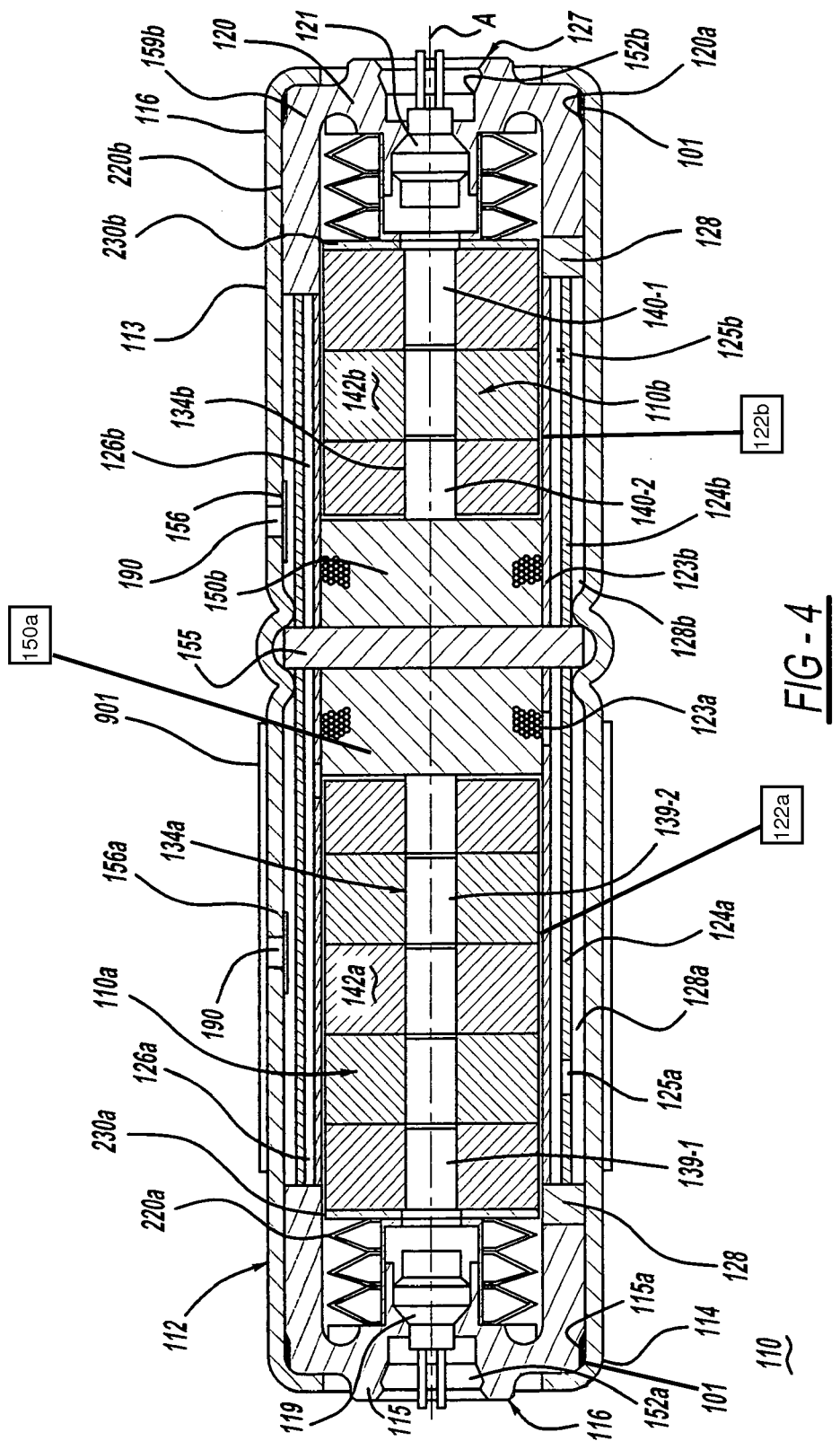
FIG. 4 is a cross-sectional side view showing the internal structure of the gas generating system of FIG. 3.

Referring to FIGS. 3 and 4, gas generating system 110 includes an elongate, substantially cylindrical housing 112, such as is well known in the art. Housing 112 has a first end 114 and a second end 116. A plurality of gas discharge apertures 190 are spaced along housing 112 to enable fluid communication between an interior of the housing and an exterior of the housing, the exterior of the housing being configured so as to enable fluid communication with an airbag (not shown) or other inflatable element of a vehicle occupant restraint system after activation of the gas generating system. Housing 112 also has a longitudinal central axis A, a wall 113 extending between ends 114 and 116, and openings formed at both ends of housing 112. The housing may be roll-formed, extruded, cast, or otherwise metal formed and may be made from aluminum, low carbon steel, or any other metal/alloy that is not gas permeable and that does not fragment during the burning of the gas generant enclosed therein.

A bulkhead 155 divides the interior volume of housing 112 into two portions, a first combustion chamber 110a and a second combustion chamber 110b arranged in a side-by-side configuration. Bulkhead 155 prevents fluid communication between first chamber 110a and second chamber 110b. Bulkhead 155 may be formed from the same material as housing 112, or from another suitable material. Bulkhead 155 may be positioned within housing 112 and secured therein, for example, by crimps formed along housing 112 on either side of the bulkhead. The positioning of bulkhead 155 along the interior of housing 112 may be adjusted such that chambers 110a and 110b are of different sizes, enabling a different quantity of gas generant composition to be positioned in each chamber, as shown in FIG. 4.

Bulkhead 155, along with filters 150a, 150b (described in greater detail below) also prevents sympathetic ignition within the gas generating system. Sympathetic ignition is defined herein as the ignition of a gas generant in one of combustion chambers 110a, 110b resulting from heat generated by the burning of gas generant in the other one of combustion chambers 110a, 110b. Sympathetic ignition would occur, for example, when a gas generant 142a is deliberately ignited in combustion chamber 110a by a first igniter 119, and where the heat and energy associated with the burning of gas generant 142a ignites gas generant 142b in second combustion chamber 110b. Bulkhead 155 and filters 150a, 150b absorb the heat from the burning of gas generants 142a and 142b to prevent sympathetic ignition.

Each of chambers 110a and 110b has the same basic arrangement of gas generating system components; thus, in general, the following discussion of the components in one of the chambers also applies to the components in the other chamber. Gas discharge apertures 190 may be covered with a foil 156 such as aluminum or stainless steel foil to prevent the incursion of water vapor into gas generating system housing 112. The foil 156, sometimes referred to as "burst foil" is typically of a thickness of from 0.01 to about 0.20 mm. The foil 156 is typically adhered to the interior surface of the housing 112 through the use of an adhesive.

A pair of substantially concentric baffle tubes 122a, 124a is positioned and secured within combustion chamber 110a, substantially centered about housing longitudinal axis A. Similarly, a pair of substantially concentric baffle tubes 122b, 124b is positioned and secured within combustion chamber 110b, also substantially centered about housing longitudinal axis A.

Baffle tubes 122a, 124a, 122b, 124b form, in conjunction with housing 112, a series of annular passages 126a, 128a, 126b, and 128b through which combustion gases propagate to discharge apertures 190 from interior portions of inner baffle tubes 122a, 122b. As is known in the art, baffle passages 126a, 128a, 126b, 128b are designed to cool the combustion products and to reduce or eliminate flaming of the combustion products prior to the products exiting the gas generating system through apertures 190. In alternative embodiments (not shown), more than two baffle tubes may be employed in one or more of combustion chambers 110a, 110b to further enhance cooling of the generated gases.

A plurality of gas discharge apertures 123a is spaced circumferentially around an end portion of inner baffle tube 122a to enable fluid communication between an interior of baffle tube 122a and an exterior of the baffle tube. Similarly, a plurality of gas discharge apertures 125a is spaced circumferentially around an end portion of outer baffle tube 124a to enable fluid communication between an interior of baffle tube 124a and an exterior of the baffle tube.

In addition, a plurality of gas discharge apertures 123b is spaced circumferentially around an end portion of inner baffle tube 122b to enable fluid communication between an interior of baffle tube 122b and an exterior of the baffle tube. Similarly, a plurality of gas discharge apertures 125b is spaced circumferentially around an end portion of outer baffle tube 124b to enable fluid communication between an interior of baffle tube 124b and an exterior of the baffle tube.

Endcaps 115, 120 are secured at respective first and second ends 114, 116 of housing 112 to seal the openings provided in the housing ends. End caps 115, 120 may be stamped, cast, or otherwise metal formed and may be made from carbon steel or stainless steel, for example. End caps 115, 120 may be crimped, welded or clamped to housing 112 in a manner sufficient to ensure a gas tight seal between endcaps 115, 120 and housing 112, and in a manner sufficient to resist elevated internal housing pressures experienced during burning of the gas generant. In the embodiment shown in FIGS. 3-4, end portions of housing 112 are crimped over shoulders formed in end caps 115, 120.

A cavity may be formed in endcap 115 to accommodate an igniter 119 secured therein, thereby forming an igniter end cap assembly 116 as described below. Similarly, a cavity may be formed in endcap 120 to accommodate an igniter 121 secured therein, thereby forming an igniter end cap assembly 127 as described below.

Endcap 115 has an annular step portion 115a formed along an outer surface thereof for receiving a silicon sealing compound 101 therealong, as described in greater detail below. Similarly, endcap 120 has an annular step 120a portion formed along an outer surface thereof for receiving a silicon sealing compound 101 therealong. Step portions 115a and 120a are configured so as to provide a cavity between each of endcaps 115, 120 and housing 112 for receiving the silicon sealing compound 101 therein when the endcaps are crimped in position within housing 112.

Hermetic seals are formed between endcaps 115, 120 and housing 112 by using a two-part quick-cure silicon compound 101. Silicone compound 101 forms a seal at each end of gas generating system 110 when end portions of housing 112 are crimped to secure endcaps 115, 120 in position. The silicone compound may include an additive causing it to fluoresce when exposed to an ultraviolet light. This enables a relatively low-cost vision system to be used during gas generating system assembly to inspect for the presence of the silicone prior to crimping of the housing to secure the endcaps. Silicone sealants as contemplated for use in the present invention are commercially available from, for example, Electro Insulation Corporation of Arlington Heights, Ill.

Referring again to FIGS. 3 and 4, gas generating system 110 also includes first and second igniters 119, 121 for igniting the gas generant in respective ones of chambers 110a and 110b. Igniter 119 is secured to housing 112 such that the igniter is in communication with an interior of combustion chamber 110a and also with an exterior of the housing. Igniter 121 also is secured to housing 112 such that the igniter is in communication with an interior of combustion chamber 110b and also with an exterior of the housing. In the embodiment shown, igniter 119 is incorporated into an igniter end cap assembly 116 that includes igniter 119 and end cap 115. Similarly, igniter 121 is incorporated into an igniter end cap assembly 127 that includes igniter 121 and end cap 120. Igniter end cap assemblies 116 and 127 are positioned along central axis A to seal openings provided in the end portions of housing 112. Igniters 119 and 121 may be formed as known in the art. One exemplary igniter construction is described in U.S. Pat. No. 6,009,809, herein incorporated by reference. Igniters 119 and 121 may be twisted or screwed into respective endcaps 115 and 120. Other contemplated means of attaching the igniters to their respective endcaps include crimping, welding, and the like.

Referring again to FIGS. 3 and 4, an elongated propagation tube 134a is provided for channeling combustion products formed by ignition of igniter 119 down the length of combustion chamber 110a, thereby producing longitudinal propagation of gas generant combustion toward bulkhead 155. Similarly, an elongated propagation tube 134b is provided for channeling combustion products formed by ignition of igniter 121 down the length of combustion chamber 110b, thereby producing longitudinal propagation of gas generant combustion toward bulkhead 155. Propagation tube 134a has an elongate, substantially cylindrical body defining a first end 139-1, a second end 139-2, and an interior cavity. Propagation tube 134a also includes a plurality of apertures (not shown) spaced along a length thereof to enable fluid communication between igniter combustion products flowing along tube 134a and a quantity of gas generant composition 142a positioned in combustion chamber 110a alongside tube 134a.

Propagation tube 134b also has an elongate, substantially cylindrical body defining a first end 140-1, a second end 140-2, and an interior cavity. Propagation tube 134b also includes a plurality of apertures (not shown) spaced along a length thereof to enable fluid communication between igniter combustion products flowing along tube 134b and a quantity of gas generant composition 142b positioned in combustion chamber 110b alongside tube 134b.

Propagation tubes 134a, 134b may be extruded or roll formed from sheet metal and then perforated. In the embodiment shown in FIGS. 3 and 4, propagation tubes 134a and 134b are positioned within housing 112 to extend along central axis A of the housing. First end 139-1 of tube 134a is positioned to enable fluid communication between igniter 119 and the interior cavity of tube 134a. First end 140-1 of tube 134b is positioned to enable fluid communication between igniter 121 and the interior cavity of tube 134b. The elongate shapes of tubes 134a and 134b provide for combustion of gas generants 142a and 142b that propagates substantially from respective tube first ends 139-1, 140-1 toward respective tube second ends 139-2. 140-2. In an alternative embodiment (not shown), tubes 134a and 134b are omitted from the gas generating system.

Referring again to FIGS. 3 and 4, a cup 152a coupled to propagation tube 134a may enclose igniter 119 to define a fluid-tight interior portion of the cup in communication with the interior cavity of tube 134a and igniter 119. In addition, a cup 152b coupled to propagation tube 134b may enclose igniter 121 to define a fluid-tight interior portion of the cup in communication with the interior cavity of tube 134b and igniter 121. Cups 152a and 152b are positioned proximate respective propagation tube first ends 139-1 and 140-1. During activation of gas generating system 110, cups 152a and 152b can each accommodate a resident interim gas pressure, facilitating ignition of respective gas generants 142a and 142b. A quantity of booster propellant (not shown) may also be positioned in the interior portions of either of cups 152a and 152b to facilitate combustion of respective gas generants 142a and 142b, in a manner known in the art. Cups 152a and 152b may be formed integral with respective propagation tubes 134a and 134b, and may be stamped, cast, or otherwise metal formed and may be made from carbon steel or stainless steel, for example. Alternatively, cups 152a and 152b may be formed separately from tubes 134a and 134b, then attached to respective ones of tubes 134a and 134b (for example, by welding or adhesive attachment) prior to assembly of the gas generating system.

Suitable gas generant compositions are disclosed, for example, in Applicant's U.S. Pat. No. 7,094,296, incorporated herein by reference. Also, other gas generants that should be incorporated by reference in the application include, but are not limited to, those described in U.S. Pat. Nos. 5,035,757, 6,210,505, and 5,872,329, also incorporated herein by reference. In the embodiment shown in FIGS. 3 and 4, gas generant 142a is in the form of a plurality of annular wafers stacked along tube 134a to substantially enclose tube 134a along a portion of its length. Similarly, gas generant 142b is in the form of a plurality of annular wafers stacked along tube 134b to substantially enclose tube 134b along a portion of its length. Each of the gas generant wafers has a cavity formed therein for receiving a portion of a corresponding propagation tube therethrough, if desired.

It will be appreciated that other, alternative arrangements of the gas generant composition may be used. For example, either (or both) of combustion chambers 110a and 110b may be partially or completely filled with a gas generant in granulated or tablet form. In addition, as stated previously, the position of bulkhead 155 may be adjusted to permit different amounts of gas generant to be positioned in chambers 110a and 110b, thereby enabling the inflation profile to be tailored according to design requirements.

Referring again to FIGS. 3 and 4, one or more spring members 220a are positioned intermediate endcap 115 and gas generant 142a for exerting a force on the gas generant to maintain the wafers or tablets comprising the gas generant in contact with each other. Force is applied by spring members 220a through an endplate 230a movable along cup 152a to press against gas generant 142a. Similarly, one or more spring members 220b are positioned intermediate endcap 120 and gas generant 142b for exerting a force on the gas generant to maintain the wafers or tablets comprising the gas generant in contact with each other. Force is applied by spring members 220b through an endplate 230b movable along cup 152b to press against gas generant 142b. Spring members 220a and 220b and endplates 230a and 230b may be formed from steel or other suitable metal alloys.

A filter 150a is incorporated into the gas generating system design for filtering particulates from gases generated by combustion of gas generant 142a. In general, filter 150a is positioned at an end of combustion chamber 110a, proximate bulkhead 155 and aligned with apertures 123a of inner baffle 122a to help ensure that inflation gas passes through the filter before exiting inner baffle 122a. Similarly, a filter 150b may be incorporated into the gas generating system design for filtering particulates from gases generated by combustion of gas generant 142b. The filters also act as a heat sink to reduce the temperature of the hot inflation gas. In general, filter 150b is positioned at an end of combustion chamber 110b, proximate bulkhead 155 and aligned with apertures 123b of inner baffle 122b to help ensure that inflation gas passes through the filter before exiting inner baffle 122b. Filters 150a and 150b may be formed from compressed knitted metal wire which is commercially available from vendors such as Metex Corp. of Edison, N.J. Alternative filter compositions and structures (not shown) are also contemplated.

A quantity of a known auto-ignition material 128 as previously described is positioned proximate an end of the stack of gas generant material 142a so as to enable fluid communication between the auto-ignition material and the gas generant 142a before and/or after ignition of the auto-ignition material. Similarly, a quantity of a known auto-ignition material 128 as previously described is positioned proximate an end of the stack of gas generant material 142b so as to enable fluid communication between the auto-ignition material and the gas generant 142b before and/or after ignition of the auto-ignition material. As in the previously described embodiment, auto-ignition material 128 is also positioned so as to be in thermal communication with housing 112 such that heat transfer between the housing and the auto-ignition composition is enabled when a portion of the housing not covered by a thermal shield 901 (described below) is exposed to elevated exterior temperatures. Auto-ignition material 128 is ignited by heat transmitted from an exterior of housing 112 to the interior of the housing due to an elevated external temperature condition (produced, for example, by a fire).

Referring again to FIGS. 3 and 4, a thermal barrier 901 covers a portion of housing 112 exterior of the first chamber 110a. As in the previously described embodiment, portion(s) of the housing in thermal communication with the auto-ignition compound are left uncovered so that heat sufficient to ignite the auto-ignition material may be transferred to the material in a timely manner.

In the multi-chamber embodiment shown in FIGS. 3 and 4, chamber 110a is longer and contains more gas generant 42 than chamber 110b. As stated previously, auto-ignition material 128 is positioned proximate housing ends 114 and 116 and is in thermal communication with the housing at these ends. As the length of housing 112 is increased, the average distance of points along the housing from either end of the housing increases. In addition, as the length of either of gas generant stacks 142a and 142b increases, the average distance of the gas generant in the stack from either end of the housing increases. Thus, for a relatively longer gas generant stack and/or housing (and depending on such factors as where the externally-generated heat impinges upon the housing), a relatively greater length of time may be required for an externally-generated heat source to heat the end(s) of the housing to ignite the auto-ignition material, due to the greater potential separation distance between the heat source and the housing end portion. This separation distance can result in relatively longer-term exposure of a more central portion of the housing to elevated temperatures while the housing ends are heating to a temperature sufficient to ignite the auto-ignition material. Such exposure may cause undesirable damage to the housing or other gas generating system components before the auto-ignition material has been heated sufficiently to ignite.

In the embodiment shown in FIGS. 3 and 4, the thermal barrier is shown applied to the exterior of the portion of the housing containing the relatively longer gas generant stack 142a.

In particular embodiments and depending on the nature of the thermal barrier and the nature of the heat source, heat may also be reflected away from the barrier. In addition, in particular embodiments of the present invention, it is believed that heat impinging on a covered portion of the housing is deflected along the barrier toward one or more exposed ends 114, 116 of the housing. This reflection and/or deflection of the incident heat greatly reduces or eliminates the potential for damage to the housing and/or system components prior to ignition of the auto-ignition material 128.

The protection afforded housing 112 by the thermal barrier also provides additional time for heat received by the uncovered housing portions to raise the temperature of the housing to a point where the auto-ignition material is activated.

The exposed or uncovered portions of the housing contain second gas generant chamber 110b housing the relatively shorter gas generant stack 142b, and the average distance from the exposed portion of the housing to the nearest end of the housing is relatively short. Correspondingly, the distance that external heat impinging on this exposed portion of the housing must travel along the housing (via conduction and/or convection) to an end of the housing proximate the auto-ignition material 128 is relatively short. Thus, because of the relatively shorter length of the second chamber 110b and the associated gas generant stack 142b, this portion of the housing exterior may be left uncovered in the embodiment shown in FIGS. 3 and 4.

Thus, in the manner described above, the barriers 900, 901 attenuate or mitigate the effects of elevated external housing temperatures (due, for example, to exposure to flame) on the covered portion(s) of the housing and/or any heat-sensitive internal gas generating system components residing on or within the covered portion of the housing, while still ensuring timely heat transfer to the auto-ignition compound, thereby permitting the auto-ignition compound to activated when desired. This prevents thermally-induced damage to the housing and/or any heat-sensitive internal components while the uncovered portion(s) of the housing is being heated to a temperature sufficient to ignite the associated auto-ignition material.

In a particular embodiment, a thermal conduit thermally connects an uncovered portion of the housing with an auto-ignition material positioned inside the housing either in operative communication with a gas generant material, or so as to enable operative communication with the gas generant material after activation of the gas generating system. Use of the thermal conduit obviates the need to position the auto-ignition material in thermal communication with an uncovered portion of the housing, and enhances flexibility in the positioning of the auto-ignition material within the housing.

If desired, at least a portion of the thermal conduit may be thermally insulated so that heat conducted along the conduit is not conducted or otherwise transmitted to a body other than the auto-ignition material in physical contact with the conduit.

In another embodiment, a portion of the thermal conduit is not in direct contact with the housing but is in thermal communication with an exterior of the housing proximate the uncovered portion of the housing, so that heat impinging on the uncovered portion of the housing also impinges on the conduit. This heat is then transmitted along the conduit to an auto-ignition material inside the housing, to ignite the auto-ignition material.

The thermal conduit may be formed from any suitable thermally-conductive material, for example, copper or a copper-containing alloy.

Also, as described herein, a method of assembling a housing unit for a gas generating system is provided. The method includes the steps of providing a housing, providing a thermal barrier, and covering a portion of the housing exterior with the thermal barrier so as to enable selective heating of the housing exterior.

Figure 5:
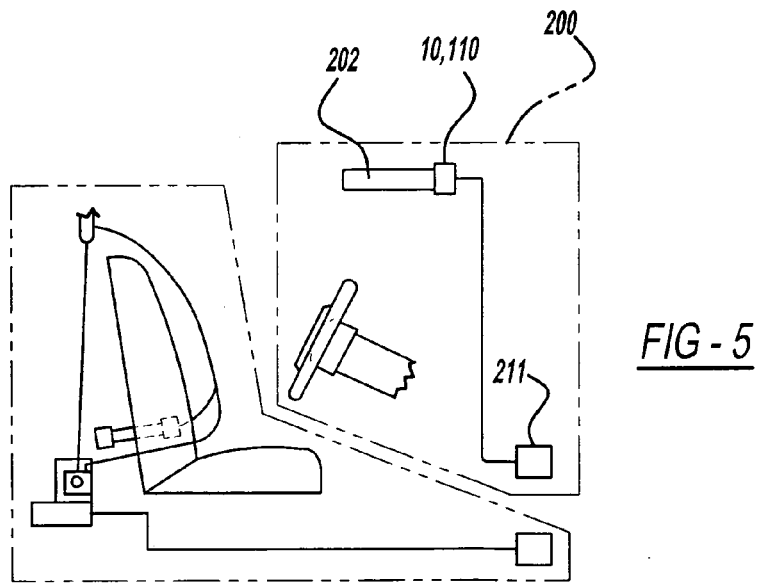
FIG. 5 is a schematic representation of an exemplary vehicle occupant protection system incorporating a gas generating system including a housing unit in accordance with one embodiment of the present invention.

Referring now to FIG. 5, a gas generating system in accordance with one of the embodiments described herein may be incorporated into a vehicle occupant restraint system 200. Vehicle occupant restraint system 200 includes at least one airbag 202 and a gas generating system 10, 110 in accordance with the present invention and coupled to airbag 202 so as to enable fluid communication with an interior of the airbag. Vehicle occupant restraint system 200 may be in operative communication with a crash event sensor 211 which communicates with a known crash sensor algorithm that signals actuation of vehicle occupant restraint system 200 via, for example, activation of airbag gas generating system 10, 110 in the event of a collision.

Although the embodiments of the present invention are described herein with reference to a gas generating system having a cylindrically-shaped housing, it will be understood that embodiments of the thermal barrier described herein can be applied to any of a wide variety of alternative housing shapes and configurations. For example, embodiments of the thermal barrier described herein may be applied to gas generating systems having housing formed from a base and cap, rather than a cylindrical tube. Embodiments of the thermal barrier described herein may be also applied to gas generating systems having multiple combustion chambers. Application of embodiments of the thermal barrier to numerous other types and structures of gas generating systems is also contemplated.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A housing unit for a gas generating system, the housing unit comprising a housing and a non-metallic thermal barrier covering a portion of an exterior of the housing, and positioned so as to deflect a portion of heat impinging on the covered portion onto an uncovered portion of the housing.

2. A gas generating system including a housing unit in accordance with claim 1.

3. A vehicle occupant protection system including a gas generating system in accordance with claim 2.

4. The housing unit of claim 1 wherein the uncovered portion of the housing is in direct contact with an auto-ignition material positioned inside the housing.

5. The housing unit of claim 1 wherein the covered portion of the housing is not in contact with an auto-ignition material positioned inside the housing.

* * * * *

UNITED STATES PATENT AND TRADEMARK OFFICE
CERTIFICATE OF CORRECTION

Page 1 of 1

PATENT NO. : 8,783,715 B2
APPLICATION NO. : 12/583614
DATED : July 22, 2014
INVENTOR(S) : Kelley et al.

It is certified that error appears in the above-identified patent and that said Letters Patent is hereby corrected as shown below:

In the Specification

Column 1; Line 25;    Please delete "a".

Column 5; Line 43;    Please delete "913" and insert --113--.

Column 8; Line 34;    Please delete "139-2.  140-2." and insert --139-2, 140-2.--.

Signed and Sealed this
Fourth Day of November, 2014

Michelle K. Lee
*Deputy Director of the United States Patent and Trademark Office*